United States Patent [19]

Leitner

[11] 4,282,943
[45] Aug. 11, 1981

[54] LAWN AERATOR

[76] Inventor: Joseph Leitner, 1868 Del Mar Ave., Redding, Calif. 96003

[21] Appl. No.: 41,543

[22] Filed: May 23, 1979

[51] Int. Cl.³ .............................................. E21B 10/44
[52] U.S. Cl. ..................................... 175/394; 172/22; 408/230
[58] Field of Search ....................... 175/394, 395, 170; 172/21, 22; 173/163; 408/125, 210, 230

[56] References Cited

U.S. PATENT DOCUMENTS

| 321,144 | 6/1885 | Soderstrom | 408/210 |
| 1,343,902 | 6/1920 | Chapman | 175/394 X |
| 1,567,829 | 12/1925 | Bettis | 175/394 |
| 1,791,186 | 2/1931 | Black | 175/394 |
| 2,305,895 | 12/1942 | Pearson | 408/125 |
| 2,908,483 | 10/1959 | Stephenson | 175/394 X |
| 3,015,364 | 1/1962 | Fitzgerald | 172/22 |

Primary Examiner—Ernest R. Purser
Attorney, Agent, or Firm—Blair, Brown & Kreten

[57] ABSTRACT

Disclosed herein is an aerator for use in providing cylindrical holes in a lawn or similar type surface so as to provide a nesting area for fertilizer and to allow the introduction of air beneath and along the root system of botanical life to be thus treated. The device comprises an elongate shaft from which emanates along the lower portion thereof a helical type of screw provided with shelf portions and a pointed extremity at the terminus of the shaft which is so constructed that the device not only cuts into the earth, but also carries the thus loosened dirt on the shelf portions so that when the device is removed from the hole a substantially cylindrical void is provided.

1 Claim, 4 Drawing Figures

U.S. Patent  Aug. 11, 1981  4,282,943
FIG. 1
FIG. 2
FIG. 3
FIG. 4
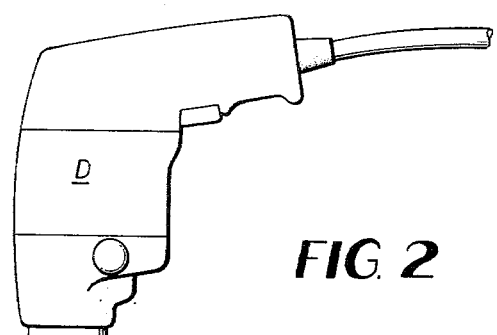
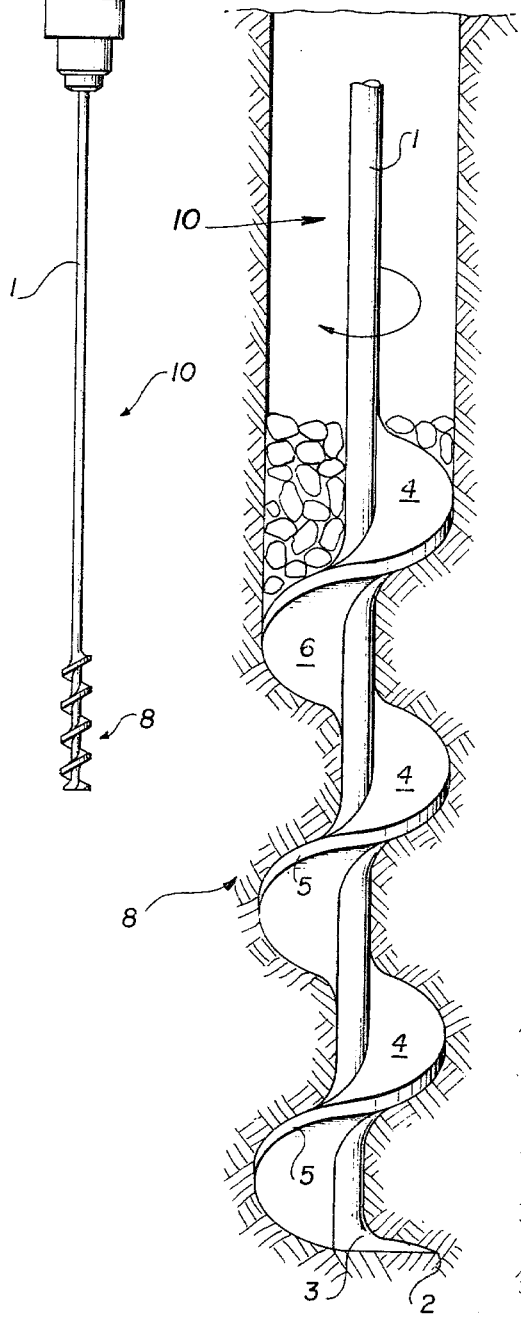
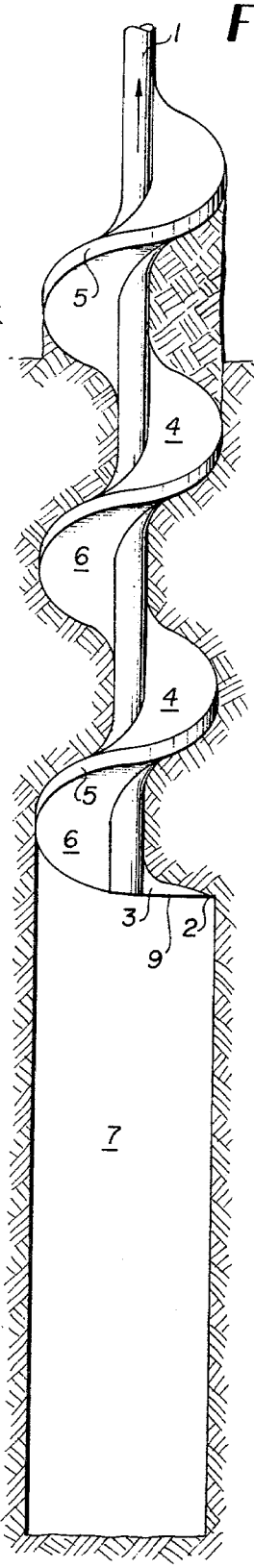
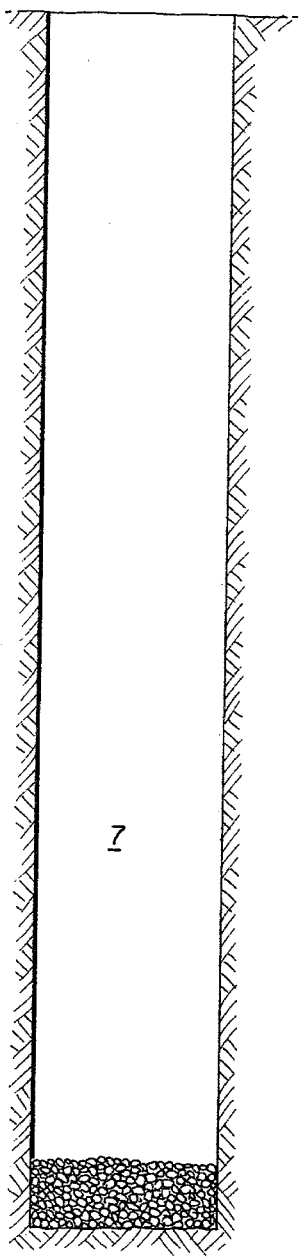

LAWN AERATOR

BACKGROUND OF THE INVENTION

It has been long known that plants and the like benefit not only from proper feeding, but also from root aeration so that maximum growing can be achieved.

To this end, the prior art provides teachings which presumeably provide these types of benefits, and the state of the art as applicant is aware comprises the following patents:

U.S. Pat. No. 790,910 McClintock
U.S. Pat. No. 1,893,258 Washburn
U.S. Pat. No. 3,151,415 James
U.S. Pat. No. 3,290,821 Parry
U.S. Pat. No. 3,695,193 Maier All patents listed above with the exclusion of Maier provide teachings whereby a spike is forced into the ground so as to provide a perforation therein, but it should be readily apparent, that the structure associated therewith provides a perforation which necessarily results in the compaction of the soil rather than aeration.

The Maier device uses an auger in combination with a rather complex piece of machinery to provide the beneficial fertilizer, but it should be appreciated from even the most cursory observation that the device while not only being substantially more complex, does not provide the efficient removal of the dirt by use of the auger because of its particular construction.

SUMMARY AND OBJECTS OF THE INVENTION

Accordingly, the ensuing detailed description provides a device which overcomes the deficiencies noted hereinabove by providing an aerator so constructed that the device provides shelf portions which serve to carry and therefore remove the dirt.

Accordingly, it is an object of this invention to provide an aerator of the character described above which does not utilize nor need a pilot screw as illustrated in the prior art, but rather provides a tip which can more readily carry the gouged material up along the helical screw portion and retain same along the shelf.

Another object contemplates providing a device of the character described in which compaction of the soil does not take place.

These and other objects will be made manifest when considering the following detailed specification when accompanied with the drawings.

BRIEF DESCRIPTION OF THE DRAWINGS

FIG. 1 is a side view of the apparatus according to the present invention;

FIG. 2 details the manner in which dirt is removed from a hole with the present invention;

FIG. 3 shows the apparatus according to the present invention removing the dirt; and FIG. 4 shows the substantially cylindrical void thereby formed.

DESCRIPTION OF THE PREFERRED EMBODIMENT

Referring to the drawings now wherein like reference numerals refer to like parts throughout the several drawings, reference numeral 10 is directed to the aerator according to the present invention.

This aerator 10 is defined by an elongate shaft 1 having a length substantially greater than the length of the drilling portion 8 so that the device can be operated while standing erect. The drilling portion 8 which is integral with the shaft is comprised of shelf portions 4 which serves to carry the dirt that is wound thereon, a bottom face of the shelf portion 4 being denoted by the reference numeral 6, an edge 5 which defines a substantially helical pattern, and a terminal portion of the aerator 10 wherein it is to be noted that the terminal portion 2 provides a tip 2 which extends substantially in the horizontal direction.

This pointed tip 2 is provided with an outwardly flaring triangular portion 3 which forms a small portion of a shelf which ultimately leads to the back face 6 of the aerator and thereafter provides a scooping action for the successive upper shelf portions 4.

In this manner, it should be clear that the horizontal tip 2 which is pointed in the horizontal direction, is provided with a cutting edge 9 defining a substantially horizontal surface at the terminus of the shaft 1 which serves to cut into the dirt and carry same upwardly. As clearly shown in FIG. 3, the shelf portions 4 carry the dirt upwardly so that when the aerator is removed, a substantially cylindrical void 7 is thus formed, as shown in FIG. 4.

Having thus described the invention, it should be apparent that numerous structural modifications are contemplated as being a part of this invention as described hereinabove and as set forth hereinbelow by the claims.

What is claimed is:

1. An aerator comprising a solid elongate shaft terminating at one end in an imperforate drilling portion integral with said shaft, said elongate shaft having a length substantially greater than the length of said drilling portion, the other end of said elongate shaft adapted to be mounted in an associated electric drill to permit a person standing erect to insert said drilling portion into the ground, said drilling portion having a substantially helical configuration forming a single spiral flight to provide a plurality of shelf portions, said drilling portion having a horizontally disposed, outwardly flaring end portion of triangular shape terminating in a pointed tip which forms a small portion of a shelf portion, said end portion being provided with a radially extending cutting edge for cutting into soil or the like for movement of the soil upwardly on said shelf portions during the rotation of said elongate shaft by said associated electric drill whereby when said drilling portion is removed from the ground, a substantially cylindrical void is provided without undue soil compaction.

* * * * *